Aug. 30, 1927.

C. W. KINCAID 1,640,547

VARIABLE SPEED INDUCTION MOTOR SET

Filed March 15, 1922   2 Sheets-Sheet 1

WITNESSES:

INVENTOR
Charles W. Kincaid
BY
Wesley G. Carr
ATTORNEY

Patented Aug. 30, 1927.

1,640,547

UNITED STATES PATENT OFFICE.

CHARLES W. KINCAID, OF WILKINSBURG, PENNSYLVANIA, ASSIGNOR TO WESTINGHOUSE ELECTRIC & MANUFACTURING COMPANY, A CORPORATION OF PENNSYLVANIA.

VARIABLE-SPEED INDUCTION-MOTOR SET.

Application filed March 15, 1922. Serial No. 543,819.

My invention relates to variable-speed induction-motor sets, and particularly to means for improving the speed-torque characteristics and the power factor thereof.

One object of my invention is to provide a combination of the general character of that shown in the joint application of Glenn E. Stoltz and Charles W. Kincaid, Serial No. 266,696, filed December 14, 1918, and assigned to the Westinghouse Electric & Manufacturing Company, with the addition, however, of the aforesaid special means for improving the speed-torque characteristic and the power factor of the set.

A further object of my invention is to provide novel means for shifting the center-line of the exciting field of a dynamo-electric machine.

A further object of my invention is to provide means for converting currents from one frequency to another and at the same time controlling the phase relationship of the currents in a novel manner.

A still further object of my invention relates to the provision of means for causing the movement of speed-regulating controller at a speed which cannot exceed a predetermined value, and the application of such means to my power-factor control of the above-mentioned variable-speed set.

An induction-motor variable speed set of the character referred to consists essentially of a main induction motor having a wound secondary member, a synchronous machine mechanically coupled to said induction motor, and a synchronously driven frequency converter of the commutator type for converting the slip-frequency currents of said secondary winding to the currents of line frequency minus slip frequency in said synchronous machine. By the adjustment of the excitation of the synchronous machine in magnitude and direction, the speed may be controlled for operation both under and over synchronous speed.

Figure 1:
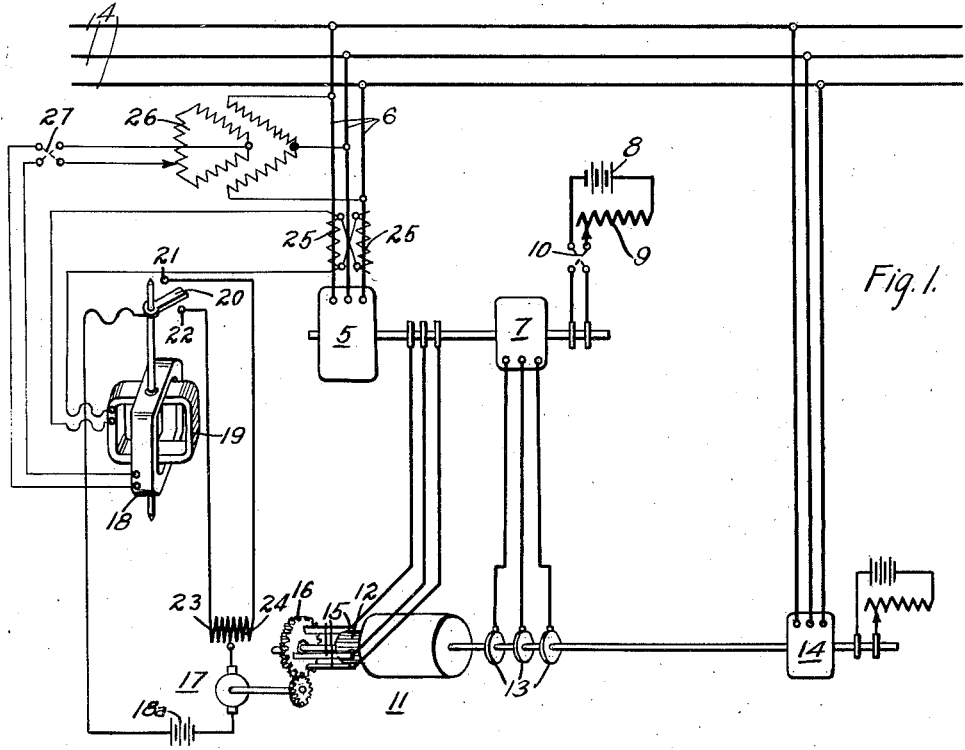
Figure 2:
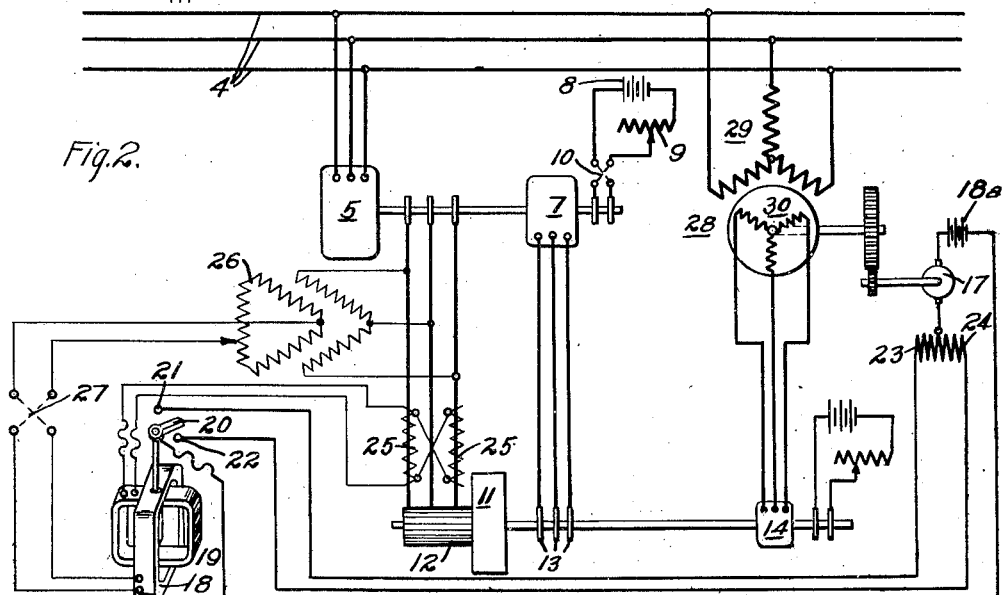
Figure 3:
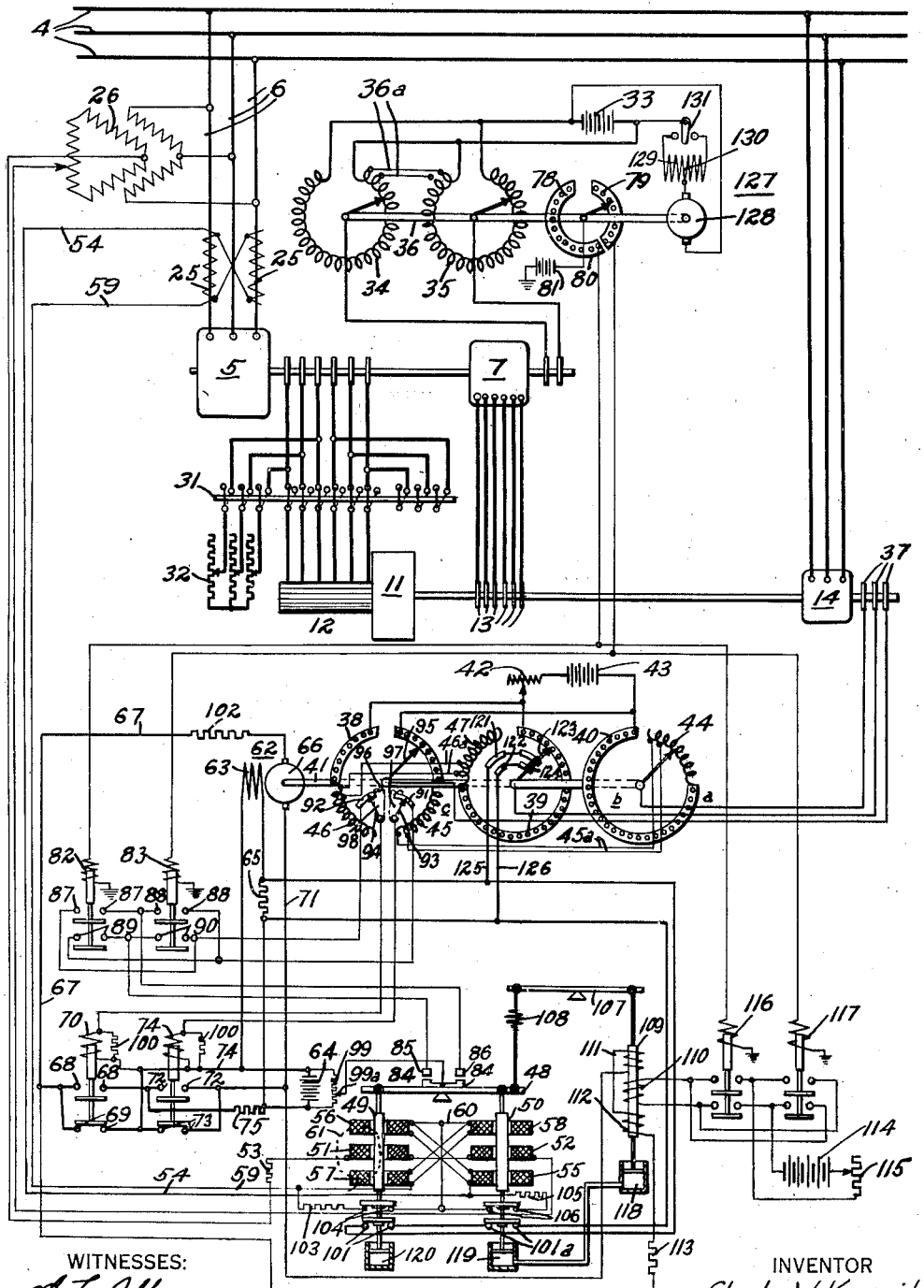

My invention consists in combinations including the induction motor set just described and in various other details and improvements which are pointed out in the following description and claims and are illustrated in the accompanying drawings, wherein:

Figs. 1 and 2 are schematic diagrams showing automatic control apparatus utilizing conventional instruments, and showing two forms of embodiment of my invention, and Fig. 3 is a schematic diagram showing in detail the apparatus and circuits now considered to be the preferred form of embodiment of my invention.

Referring particularly to Fig. 1 of the drawing, I have shown alternating-current mains 4 supplying a main induction motor 5 through conductors 6. Mounted on the same shaft as the motor 5 is a synchronous machine 7 having a field winding provided with slip rings which are energized through a suitable source 8, a rheostat 9 and a reversing switch 10. A frequency converter 11 is also shown having a commutator cylinder 12 and slip rings 13 and being driven by a synchronous motor 14 energized from the supply lines 4. Bearing upon the commutator member 12 are a plurality of symmetrically distributed brushes 15 which are carried by a revoluble brush-holder 16 which is, in turn, geared to a regulating motor 17 for adjusting the angular position of the brushes. The brushes 15 are connected to the secondary windings of the main motor 5, while the slip rings 13 are connected to the synchronous machine 7.

During under-synchronous operation, the slip-frequency currents generated in the secondary of the main motor are transformed, through the synchronously running frequency converter 11, into currents having line frequency minus slip frequency, which are supplied to the synchronous machine 7 to drive the same as a motor assisting the main motor 5 in supplying torque to the load.

The electromotive force of the currents generated in the induction-motor secondary windings are proportional to the slip, and hence the speed may be regulated by adjusting the electromotive force developed by the synchronous machine 7. When the electromotive force just mentioned is reduced to zero, the set runs at a speed somewhat below synchronism. By reversing the excitation of the synchronous machine and supplying a small field in the reverse direction, the speed of the set may be brought up to synchronous speed, and by still further increasing the field, over-synchronous speeds may be obtained within the range of the apparatus.

During over-synchronous operation, the synchronous machine 7 operates as a generator of currents having a frequency equal to the line frequency plus slip frequency. The currents generated in the synchronous machine 7 are converted, in the frequency converter 11, to slip-frequency currents which are fed to the secondary windings of the main motor 5 to drive the latter as a doubly-fed motor.

I have found that the power factor of the set varies between wide limits as the speed is adjusted from maximum buck to maximum boost, and I have observed further that the speed-torque characteristics, or variations in speed under varying loads for any given setting of the speed-regulating rheostat, are very different for certain speeds than for others, rendering some sort of speed regulator particularly essential. The principal cause for the wide variations in the power factor lies in the fact that the synchronous machine 7 is sometimes operated as a motor and sometimes as a generator with an excitation which varies from zero to the full field strength for which the machine is designed.

In attempting to apply power-factor corrective means to my device, I have found that if the power factor is maintained substantially constant throughout the operation of the device, the speed-torque characteristics of the set will be affected by the value of the power factor chosen. By properly choosing the power factor I have found that, in many cases, a speed-torque characteristic may be obtained which sufficiently closely approximates the desired characteristics at all speeds and all loads without the necessity for employing additional speed-responsive regulating devices. For steel-mill drives and similar heavy service, the most satisfactory operation of the sets so far employed by me occurs at a value approximating the normal lagging power factor of the main motor.

In the embodiment disclosed in Fig. 1, the power factor is controlled by causing a phase displacement between the currents traversing the secondary windings of the induction motor 5 and the currents traversing the synchronous machine 7 or, in other words, varying the flow of reactive power between these machines. The phase displacement is secured by shifting the brushes 15 in one direction or the other as may be necessary to secure the desired results.

In Fig. 1 I have shown a conventional form of regulating device responsive to the power factor of the currents in the conductors 6 supplying the main motor 5. The power-factor relay comprises a voltage coil 18 and a relatively movable current coil 19 carrying a switch arm 20 which is adapted to be moved into engagement with contacts 21 or 22, whereby the regulating motor 17 may be energized through a battery 18ª and either one of two oppositely connected field windings 23 and 24.

The current coil 19 is energized from a pair of current transformers 25 which may be connected in two of the leads 6 of the motor 5. The current coils are shown as being connected in parallel for supplying to the current coil 19 a component current having a phase intermediate the phases of the currents in the coils of transformer 25.

The voltage coil 18 of the power-factor relay is energized from the secondary winding of a potential transformer 26 connected across the supply leads 6 of the main motor. The secondary windings of the potential transformer are shown as being delta connected, and the potential is tapped off from one apex of the delta to a point on the opposite winding thereto, said point being shifted from the exact middle of the winding by an amount depending upon the departure of the selected power factor from 100%.

The current and the potential transformers 25 and 26 are so connected that when the power factor of the current is at the desired value the currents traversing the coils 18 and 19 will have a 90° phase relationship, whereby there will be no effective torque developed in the power factor of the relay. Under these conditions, the interaction of the fields set up by the currents in the two coils 18 and 19 will produce equal torques first in one direction and then in the other in successive half cycles of the current, the resultant torque being zero, since the inertia of the device is too great to permit it to follow such rapid fluctuations. If, however, the power factor departs from the value for which the relay is adjusted a torque will be developed in one direction or the other to bring the switch arm 20 into contact with one of the conductors 21 or 22 to energize the regulating motor 17 in the proper direction until the power factor is brought back to the desired value.

Since the flow of energy in the frequency converter 11 reverses in direction as the set passes through synchronism, it is necessary to shift the brushes in the opposite direction during over-synchronous operation than during under-synchronous operation for any given departure of the power factor from the predetermined value. The voltage coil 18 is therefore provided with a reversing switch 27 which must be actuated whenever the set passes through synchronism.

In Fig. 2, a slightly different form of control is shown. Since the synchronous machine 7 is the main cause of undesirable power factors, the power factor relay may be connected in the circuit thereof, or, as shown in Fig. 2, in the serially connected secondary circuit of the main motor 5. It will be understood that changes in the power factor of the secondary circuit produce similar changes in the primary circuit of the motor 5.

In Fig. 2 also, the effect of shifting the brushes 15 is produced by causing a phase shift in the polyphase currents supplied to the synchronous motor 14, whereby the angular position of the synchronously rotating shaft of the frequency converter 11 is adjusted. The shift in phase of the current supplied to the motor 14 is secured by means of an induction regulator 28 having primary windings 29 connected to the supply lines 4 and rotatably mounted secondary windings 30 connected to the synchronous motor 14. The angular position of the secondary windings 30 is controlled by the regulating motor 17 which is suitably geared thereto.

In Fig. 3, I have shown a still further embodiment of the invention which at present is regarded as the preferred form. In this embodiment, the secondary windings of the main motor 5 are provided with six slip rings which are adapted to be connected to a corresponding number of brushes bearing upon the commutator member 12 of the frequency converter 11.

A starting switch 31 is provided which can be shifted from the full-line position shown, wherein the six slip rings of the motor 5 are connected to the six commutator brushes of the frequency converter 11, to the dotted-line position, wherein the frequency converter 11 is disconnected and the secondary windings of the motor 5 are star connected to a variable starting resistance device 32.

The synchronous machine 7 is excited from a suitable source 33 through two rheostats 34 and 35 which are connected in opposite directions to said source and have their switch arms mounted on a common shaft 36 and connected, respectively, to the two terminals of the field winding of the synchronous machine 7. In this manner the speed of the set may be adjusted from maximum buck to maximum boost by a continuous rotation of the rheostat shaft through 360°.

In order to effect economies in the resistors, equipotential points on the rheostats 34 and 35 may be interconnected by means of conductors, as indicated at 36ª. If such interconnection is provided, one of the resistance elements may be omitted entirely, if desired. Details of the field regulating rheostats 34 and 35 form the subject-matter of a copending application of George W. Huey, Serial No. 414,994, filed October 6, 1920, and assigned to the Westinghouse Electric & Manufacturing Company.

Instead of employing an induction regulator 28 to produce a shift in the angular position of the synchronously rotating shaft of the frequency converter 11, I have provided the synchronous motor 14 with a three-phase exciting winding, the terminals of which are brought out to the slip rings 37. The latter are connected, through conductors $a$, $b$ and $c$, to the arms of three rheostats 38, 39 and 40, which are mounted on a common shaft 41. The rheostats 38, 39 and 40 are connected, through a variable resistor 42, to a battery 43 in such manner that the division of the current between the respective phases of the exciting winding is so adjusted that the center line of the excitation may be shifted without materially varying the strength of the resultant field.

In the first quadrant of the rheostat setting, phase $a$ is connected to the positive terminal of the source through a variable resistance 44 which is mounted in the first quadrant of the rheostat 40, phase $b$ is directly connected to the negative terminal of the source, and phase $c$ is directly connected to the positive terminal of the source. In the second quadrant of the rheostat adjustment, phases $a$ and $b$ are directly connected to the positive and negative terminals respectively, while phase $c$ is connected to the positive terminal through a variable resistor 45 mounted in the second quadrant of the rheostat 38. In the third quadrant, the excitation of phases $a$ and $b$ is unaltered but the polarity of phase $c$ is reversed, said phase being connected to the negative terminal of the source through a variable resistor 46 mounted in the third quadrant of the resistor 38. In the fourth quadrant of the rheostat adjustment, phases $a$ and $c$ are directly connected to the positive and negative terminals of the source, respectively, while phase $b$ is connected to the negative terminal through a variable resistor 47 located in the fourth quadrant of the rheostat 39.

By a continuous movement of the rheostat shaft 41, the center line of the resultant field in the synchronous motor 14 may be shifted through substantially 120° without producing excessive fluctuations in the amount of the resultant excitation. Economies may be effected in the utilization of the resistance elements 44, 45, 46 and 47 by connecting corresponding points of resistors 44 and 45 and also connecting corresponding points of resistors 46 and 47, as indicated, schematically, by the conductors 45ª and 46ª respectively. If such conductors are employed, the resistance elements 45 and 46 may be omitted, as will be obvious.

In lieu of the conventional meter type of power-factor relay shown in Figs. 1 and 2, I have shown, in Fig. 3, a Tirrill-regulator type of power-factor relay which is employed in the actual embodiment of the speed regulating set, as now designed. The regulator comprises a centrally pivoted arm 48, to the respective ends of which are attached two armature-core members 49 and 50. Enclosing the respective armature members 49 and 50 and centrally disposed with respect to the length thereof are two voltage coils 51 and 52 which are serially connected, through a regulating resistor 53, to the secondary member of the voltage transformer 26 previously described in connection with Fig. 1.

On both sides of the voltage coils 51 and 52 are mounted current coils which are disposed in symmetrical relation with respect to the ends of the armature members 49 and 50. One conductor 54 from the current transformers 25 is connected to the bottom coil 55 encircling the armature member 50 and the top coil 56 encircling the armature member 49, said coils 55 and 56 being connected in parallel. In like manner, the remaining armature coils 57 and 58 are connected in parallel, with one terminal connected to the other conductor 59 of the current transformers 25. The two groups of parallel-connected current coils are connected in series by a conductor 60.

The operation may be explained by considering the coils 56, 51 and 57 which operate upon the armature member 49. The flux produced by the centrally located voltage coil 51 has been indicated by a dotted line 61. It will be seen that the flux has a component at right angles to the axis of the solenoid which produces a longitudinally directed force between the current coil 56 and the armature member 49, said force being proportional to the product of the current and voltage multiplied by the sine of the angle of departure of the currents in the two coils 51 and 56 from the exact 90° relation. A longitudinally directed force is therefore obtained which becomes zero when the desired phase relationships are obtained.

However, the coil 56 also has a solenoid action upon the armature 49, which is proportional to the magnitude of the current in the current transformers 25. In order to counteract such action, the current coil 57 is added to produce a like component which is proportional to the sine of the angle of displacement, but producing a counteracting solenoid action. The coils surrounding the other armature member 50 are in all respects similar, except that one armature is moved upwardly while the other is moved downwardly upon the occurrence of any departure from the predetermined phase relation.

The power-factor relay is adapted to control a regulating motor 62 which is mounted on the shaft 41 of the center-line shafting rheostats 38, 39 and 40. The motor 62 is provided with a shunt field winding 63 which is energized from a battery 64 through a resistor 65.

One terminal of the armature 66 of the regulating motor is connected, through a conductor 67, to one terminal of the normally open switch contacts 68 and to one terminal of the normally closed switch contacts 69 of an automatic relay 70. The other terminal of the armature 66 is connected, through a conductor 71, to one terminal of the normally open switch contacts 72 and to one terminal of the normally closed switch contacts 73 of a similar relay 74.

The second terminal of contacts 68 and 72 are connected, through a protective resistor 75, to the positive terminal of the battery 64, while the second terminal of contacts 69 and 73 are connected, through a conductor 74, to the negative terminal of the battery. It will be observed, therefore, that the armature 66 is normally short circuited through the contacts 69 and 73 which are connected to the negative terminal of the battery 64, but when the actuating coil of either relay 70 or 74 is energized, one terminal of the armature 66 will be disconnected from the negative terminal of the battery and connected to the positive terminal to send a current through the armature in a direction dependent upon the relay that is energized. Specific details of construction of the relays 70 and 74 form the subject-matter of an application of Clarence A. Boddie, Serial No. 378,732, filed May 4, 1920, and assigned to the Westinghouse Electric & Manufacturing Company.

Since it is necessary for the regulating motor 62 to operate in different directions, during over and under synchronous speeds, in order to effect a given correction in the power factor, there is provided an auxiliary contact member 78, mounted upon the shaft 36 of the rheostats 34, 35, which regulate the excitation of the synchronous machine 7 to control the speed of the set. The contact member 78 comprises an ordinary rheostat face-plate having the contactor studs short circuited in two groups 79 and 80, which are so arranged that one group corresponds to over-synchronous operation while the other group corresponds to under-synchronous operation. The movable arm of the auxiliary contact member 78 is connected to ground through a suitable source 81, while the two groups 79 and 80 are connected to the actuating coils of switches 82 and 83, respectively, the other terminals of the coils being grounded to complete the circuit.

The switches 82 and 83 are each provided with two pairs of normally open contacts which are connected, through suitable control mechanism, presently to be described, to the actuating coils of relays 70 and 74.

The rocking arm 48 of the power-factor relay carries a contact member 84 adapted to engage the one or the other of contacts 85 and 86 when said arm is moved from its normal neutral position. The contact member 86 is connected to one terminal of each of the normally open pairs of contacts 87 and 88 of the switches 82 and 83, respectively. The contact member 85 is connected to one terminal of each of the other normally open pairs of contacts 89 and 90 of the switches 82 and 83. The remaining terminals of contacts 88 and 89 are connected to a contact segment 91 of the rheostat 38 while the remaining terminals of contacts 87 and 90 are connected to a second contact segment 92 on said rheostat.

The contact segments 91 and 92 are engaged by movable arms 93 and 94, respectively, to provide limit switches for preventing the over-travel of the rheostat arm 95, the movable arms 93 and 94 being actuated by a pin 96 engaging notched segment arms 97 and 98 carried by the movable arms 93 and 94, respectively. The arms 93 and 94 are connected, respectively, to the actuating coils of relays 74 and 70. The remaining terminals of the actuating coils of relays 74 and 70 are connected to the negative terminal of the battery 64, the circuit being completed by means of a potentiometer 99 connected across the two terminals of the battery 64, and having a movable contact member 99ª which is connected to the contact member 84 of the rocking arm 48.

When the rocking arm 48 of the power-factor relay is moved to bring the contact member 84 into engagement with one or the other of the contacts 85 or 86, a circuit is completed, from the potentiometer 99, through the contacts of the relays 82 and 83, to the segment arm 91 or 92, dependent upon which of the contacts 85 or 86, and which of the switches 82 or 83 is energized.

For example, during under-synchronous operation the switch 82 is energized. An increase in the power factor will energize, say, contact member 85, thereby causing the potentiometer 99 to be connected to the contact segment 91. However, during over-synchronous operation, the switch 83 will be closed, and, hence, an increase in the power factor would cause the potentiometer 99 to be connected, through the contact member 85, to the other contact segment 92. In this manner, the relays 70 and 74 are selectively energized to drive the regulating motor 62 in the proper direction to correct the power factor of the set. The actuating coils of the relays 70 and 74 are each shunted by a non-inductive resistor 100, in order to reduce sparking at the various controlling contacts.

When the power-factor relay is in the neutral position the field-magnet resistor 65 is short-circuited by means of two serially connected contacts 101 and 101ª carried by the solenoid members 49 and 50, respectively, the arrangement being such that the short-circuit is broken whenever the rocking arm 48 is actuated. In this manner, a strong field magnetization is provided when the power-factor relay is in neutral position, and, since the armature 66, at the same time, is short circuited through the normally closed contacts 69 and 73, the regulating motor 62 exerts a powerful braking action to quickly bring the rheostat shaft 41 to a standstill upon the deenergization of the motor. The short-circuit current of the armature 66 is limited by means of a resistor 102 which is serially included in the conductor 67.

In order to prevent over-travel of the regulating device, there is provided a shunting resistor 103 which is connected, through normally closed switch contacts 104 carried by the armature 49, between the conductor 59 and the conductor 60, whereby said resistor 103 is normally in shunt with the current coils 57 and 58. In like manner a resistor 105 is connected, through normally closed switch contacts 106 carried by the armature 50, between conductors 54 and 60, whereby said resistor is normally connected in shunt with the current coils 55 and 56.

Whenever the rocking arm 48 is actuated, the circuit of one of the resistors 103 or 105 is opened in such manner that the solenoid action of the current coils is no longer balanced and a resultant solenoid torque is produced which tends to return the rocking arm 48 to normal position. In this manner, the rocking arm is caused to alternately make and break contact at 84 when the power factor has been adjusted almost to the correct value.

The apparatus shown is also provided with means for causing the rocking arm 48 to return to normal position more quickly when the regulating motor 62 is traveling at a high speed than when the motor is traveling slowly, in order to provide a further safeguard against moving the rheostat shaft too far. To this end there is provided a second rocking arm 107 having one end connected to one end of the rocking shaft 48 through a spring 108. The other end of the rocking arm 107 is actuated by means of a magnet comprising an armature core member 109 within a solenoid member comprising a central coil 110 and two oppositely connected end coils 111, 112, whereby the flux produced by the central coil is always opposed by one of the end coils and assisted by the other. By changing the direction of the currents in such manner that first one end coil and then the other will assist the central coil, the effective center of magnetization of the solenoid will be changed. Since the solenoid tends to draw the armature core to a position which is substantially symmetrical with respect to its flux, the armature core will be drawn up or down according to the energization of the end coils relatively to the central coil.

The end coils 111 and 112 are serially but oppositely connected to be energized from the conductors 67 and 71, through a resistor 113, in order to respond to the voltage across the armature 66 of the regulating motor 62. When the armature is moving fast the current therein is low and hence the voltage-drop in the resistor 75 or other line connections is also low. The end coils 111 and 112 will therefore be impressed with a high voltage in accordance with the speed of the motor 62. However, if the armature circuit is opened immediately after it has been closed and before the motor has had time to speed up, the voltage-drop in the resistor 75 is relatively high and the energization of the end coils 111 and 112 is correspondingly decreased.

The central coil 110 is energized from a suitable source such as a battery 114 and rheostat 115, through pole changing relays 116 and 117 similar to the relays 82 and 83 and energized in parallel therewith, respectively. Thus the energization of the central coil 110 is reversed when the set passes through synchronism.

The movement of the armature core 109 is restricted by a dash-pot 118 which is hydraulically connected to a dash-pot 119 connected to the armature member 50, whereby sudden changes in the pull of the solenoid 110, 111, 112 are transmitted to the rocking arm 48, while smaller changes produce but a slight effect upon the rocking arm 48 on account of the spring connection 108 and leakage in the dash-pots 118 and 119. The armature member 49 is provided with an independent dash-pot 120 to further control the movement of the rocking arm 48.

The solenoid coils 110, 111 and 112 are so connected that a variable force responsive to the speed of the regulating motor is applied to the rocking arm 48 in such direction as to tend to restore it to normal position and open whichever of the contacts 85 or 86 is closed. This action follows from the fact that, so long as the set does not pass through synchronism, the polarity of the armature 66 is dependent upon the direction of rocking of the arm 48. The end coils 111 and 112, being connected across the armature terminals, cause the armature core to be drawn either upwardly or downwardly in order to bias the rocking arm 48 toward neutral position.

When the set passes through synchronism, the switches 82 and 83 shift to reverse the effect of the rocking arm 48 upon the polarization of the armature, whereby the end coils 111 and 112 would cause the armature core to be drawn in the wrong direction were it not for the operation of the switches 116 and 117 in reversing the relative direction of the current in the central coil 110 with respect to the end coils 111 and 112.

Means are also provided for causing the regulating motor 62 to slow down when the limits of travel of the center-line shifting rheostats 38, 39 and 40 are approached, as will be well understood by those skilled in the art. To this end, contact members 121 and 122 are provided on the face of the rheostat 39 and are disposed adjacent to the limits of travel of the rheostat arm 123. The latter is provided with a contacting member 124 which forms a connection between the contacts 121 and 122 and short-circuits the field resistor 65 of the regulating motor 62 through conductors 125 and 126 which are connected to the contact members 121 and 122, respectively.

Details of the construction and arrangement of the power-factor regulating means per se form the subject-matter of an application of Clarence A. Boddie, Serial No. 752,360, filed Nov. 26, 1924 (Case 9275) and assigned to the Westinghouse Electric & Manufacturing Company.

When the shaft 36 of the speed regulating rheostats is operated directly by hand there is danger that the lever may be moved so fast that severe overloads, as well as other undesirable conditions, are produced in the machines. For this reason, I have provided a small actuating motor 127 having an armature 128 mechanically connected to the shaft 36 for driving the same at a predetermined slow speed. The speed is so adjusted that the operation of the power-factor regulating rheostat will be more rapid than the operation of the speed regulating rheostat, thereby avoiding the tendency to hunting.

One terminal of the armature 128 is connected to the negative terminal of the battery 33. The other armature terminal is connected to a common terminal of two reversely wound series field windings 129 and 130 which are adapted to be connected to the positive battery-terminal by a manually-controlled reversing switch 131 in order to operate the motor in forward and reverse directions, respectively. When the shaft 36 has been adjusted to the desired position, the actuating motor 127 is de-energized by means of the switch 131.

While I have shown several forms of my invention in the appended drawing, I do not wish to be restricted thereto, but I desire that only such restrictions shall be placed upon my invention as are set forth in the appended claims.

I claim as my invention:

1. A variable-speed induction-motor set, comprising an induction motor having a wound secondary member, a synchronous machine mechanically connected thereto, frequency-converting means interconnecting said secondary member and said synchronous machine, means for variably exciting said synchronous machine in a direction producing under-synchronous operation, means for increasing the excitation in the opposite direction sufficiently to produce synchronous operation, means for still further increasing the excitation in said opposite direction for producing over-synchronous operation, automatic regulating means of a type requiring reversal of connections when the set passes through synchronism, and means mechanically interlocked with said several exciting means for effecting said reversal at the proper point in the adjustment of said exciting means.

2. A variable-speed induction-motor set comprising an induction motor having a wound secondary member, a synchronous machine mechanically connected thereto, frequency-converting means interconnecting said secondary member and said synchronous machine, means for variably exciting said synchronous machine in either direction for both over and under-synchronous operation, power-factor responsive means for shifting the phase relationship between the currents and the terminal voltage in said secondary member, and means for reversing the direction of shift of said power-factor responsive means as the set passes through synchronism.

3. A variable-speed induction-motor set comprising an induction motor having a wound secondary member, a synchronous machine mechanically connected thereto, frequency-converting means interconnecting said secondary member and said synchronous machine, means for variably exciting said synchronous machine in either direction for both over and under-synchronous operation, means for automatically producing a change in the power-factor of the currents in said secondary member and of the currents in said synchronous machine in response to a varying quantity entering into the operation of said set, and means for reversing the direction of change effected by said automatic means as the set passes through synchronism.

4. A variable-speed induction-motor set comprising an induction motor having a wound secondary member, a synchronous machine mechanically connected thereto, frequency-converting means interconnecting said secondary member and said synchronous machine, means for variably exciting said synchronous machine, said frequency converting means including an armature member provided with slip rings and a commutator member, brushes therefor, means for driving said armature member at synchronous speed corresponding to line frequency, means for automatically shifting the phase relationship between the currents in said secondary member and the voltage at the terminals of said frequency converting means in response to a varying quantity entering into the operation of said set, and means for reversing the direction of shift of said automatic means as the set passes through synchronism.

5. A variable-speed induction-motor set, comprising an induction motor having a wound secondary member, a synchronous machine mechanically connected thereto, frequency-converting means interconnecting said secondary member and said synchronous machine, means for varying the speed of the set, and means for maintaining a substantially constant lagging power factor for the currents traversing the primary member of said induction motor.

6. A variable-speed induction-motor set comprising an induction motor having a wound secondary member, a synchronous machine mechanically connected thereto, frequency-converting means interconnecting said secondary member and said synchronous machine, means for producing a variation in the ratio between the speed of the set and the effective electromotive force of said synchronous machine as applied to said secondary member, and means for automatically adjusting the power factor of the currents traversing the primary member of said induction-motor in such manner as to produce a predetermined speed-torque characteristic.

7. A variable-speed induction-motor set comprising an induction motor having a wound secondary member, a synchronous machine mechanically connected thereto, frequency-converting means interconnecting said secondary member and said synchronous machine, means for producing a variation in the ratio between the speed of the set and the effective electromotive force of said synchronous machine as applied to said secondary member, power-factor responsive means for adjusting the reactive power interchanged between said secondary member and said synchronous machine while maintaining said ratio substantially constant, and means for preventing said ratio-changing means from operating more rapidly than said power-factor controlling means.

8. A variable-speed induction-motor set comprising an induction motor having a wound secondary member, a synchronous machine mechanically connected thereto, frequency-converting means interconnecting said secondary member and said synchronous machine, means for producing a variation in the ratio between the speed of the set and the effective electromotive force of said synchronous machine as applied to said secondary member, means for automatically maintaining a substantially constant power-factor for the currents traversing one of the electrical circuits of said set, and means for preventing said ratio-changing means from operating more rapidly than said power-factor controlling means.

In testimony whereof, I have hereunto subscribed my name this 10th day of March, 1922.

CHARLES W. KINCAID.